(12) United States Patent
Kim et al.

(10) Patent No.: US 7,412,715 B2
(45) Date of Patent: Aug. 12, 2008

(54) METHOD AND APPARATUS FOR DISPLAYING CHANNEL INFORMATION AND SELECTING CHANNEL ON DIGITAL TELEVISION

(75) Inventors: Pan-Jin Kim, Kyonggi-do (KR); Sik-Won Jeong, Kyonggi-do (KR); Phil-Tae Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 810 days.

(21) Appl. No.: 09/873,997

(22) Filed: Jun. 6, 2001

(65) Prior Publication Data

US 2001/0052124 A1 Dec. 13, 2001

Related U.S. Application Data

(62) Division of application No. 09/179,872, filed on Oct. 28, 1998.

(51) Int. Cl.
*H04N 5/445* (2006.01)
*H04N 5/50* (2006.01)
*G06F 3/00* (2006.01)
*G06F 13/00* (2006.01)

(52) U.S. Cl. ............................. 725/38; 725/57; 348/731
(58) Field of Classification Search .................. 725/38, 725/57; 348/731
See application file for complete search history.

(56) References Cited

U.S. PATENT DOCUMENTS 4,677,484 A 6/1987 Pitsch et al.
5,161,023 A 11/1992 Keenan
5,191,423 A 3/1993 Yoshida
5,317,403 A 5/1994 Keenan
5,353,121 A 10/1994 Young et al.
5,629,733 A 5/1997 Youman et al.
5,731,844 A 3/1998 Rauch et al.
5,838,386 A 11/1998 Kim
5,867,207 A 2/1999 Chaney et al.
5,886,995 A 3/1999 Arsenault et al.
5,894,320 A 4/1999 Vancelette
5,900,915 A 5/1999 Morrison
5,929,932 A 7/1999 Otsuki et al.
5,982,411 A * 11/1999 Eyer et al. ..................... 725/49
6,002,394 A * 12/1999 Schein et al. ................. 725/39
6,104,436 A 8/2000 Lee
6,111,611 A 8/2000 Ozkan et al.
6,133,910 A 10/2000 Stinebruner
6,137,539 A * 10/2000 Lownes et al. ............... 348/569
6,172,674 B1 1/2001 Etheredge
6,473,903 B2 10/2002 Balakrishnan et al.
6,661,472 B2 * 12/2003 Shintani et al. ............. 348/732
6,763,522 B1 * 7/2004 Kondo et al. ................. 725/39
2002/0167609 A1 11/2002 Seo

* cited by examiner

*Primary Examiner*—Hunter B. Lonsberry
(74) *Attorney, Agent, or Firm*—Staas & Halsey LLP

(57) ABSTRACT

A method for displaying channel information on a digital TV. Channel information which can know the number of programs or program numbers received through a currently selected major channel is displayed. As channel information, a major channel number and minor channel numbers are displayed. If a channel up or down key is pressed, a viewing program is selected and corresponding channel information is displayed on a TV screen.

7 Claims, 10 Drawing Sheets

METHOD AND APPARATUS FOR DISPLAYING CHANNEL INFORMATION AND SELECTING CHANNEL ON DIGITAL TELEVISION

CROSS-REFERENCE TO RELATED APPLICATIONS

This application is a Divisional of U.S. patent application Ser. No. 09/179,872 filed Oct. 28, 1998, the disclosure of which is incorporated herein by reference.

BACKGROUND OF THE INVENTION

1. Field of the Invention

The present invention relates to a digital television (TV), and more particularly, to a method for displaying channel information on a TV screen so as to select a channel.

2. Description of the Related Art

An analog TV broadcasting system, an NTSC (National Television System Committee) broadcasting system for example, can broadcast only one program with respect to a frequency band of one determined RF (Radio Frequency) channel. On the other hand, a digital TV broadcasting system has more RF channels than the analog TV broadcasting system. In addition, it is possible to transmit a plurality of programs in a limited transmission bandwidth of one RF channel. For example, SDTV (Standard Definition Television) programs' such as analog TV broadcasting program's may be simultaneously broadcast for a specific period of time through an RF channel, and an HDTV (High Definition Television) program may be broadcast for another period of time through an RF channel. The U.S. ATSC (Advanced Television System Committee) standard shows such an example. A channel through which a plurality of programs are broadcast by one physical channel, that is, an RF channel, is called a "major channel", and a channel of each program broadcast through such a major channel is called a "minor channel".

Since the digital TV broadcasting system can broadcast a plurality of programs through one major channel, it is necessary to display program guide information on a TV screen so that a user may select one of these programs. For this, the ATSC standard specifies an electronic program guide (EPG) to enable the user to select a desired program. A broadcasting station transmits EPG information with respect to each RF channel. The digital TV then receives and stores the EPG information and displays the EPG information on its screen in response to a demand from the user.

The user can be aware of the number of programs broadcast through one major channel by using the EPG information. For this, however, the user should additionally demand to display the EPG information. In the case where the user directly enters a channel number to select any one major channel, it is inconvenient to see if how many programs are broadcast through the selected major channel or to select a program, in comparison with the analog TV broadcasting system. Furthermore, the user may feel confusion in selecting a channel because a broadcasting station broadcasts analog and digital TV broadcasting programs at the same time. Therefore, the digital TV broadcasting system should enable the user to easily be aware of the number of programs broadcast through a selected major channel and to easily select programs. However, in an analog TV, only RF channels can be selected by using a remote control. That is, in a conventional channel selecting method, it is impossible to select a minor channel corresponding to a desired program among a plurality of minor channels broadcast through one major channel in digital TV broadcasting.

SUMMARY OF THE INVENTION

It is an object of the present invention to provide a channel information displaying method which can be easily aware of the number of programs broadcast through a selected major channel in a digital TV.

It is another object of the present invention to provide a channel information displaying and channel selecting method which can easily select programs broadcast through a selected major channel in a digital TV.

In accordance with one aspect of the present invention, a method for displaying channel information on a digital TV for receiving digital multichannel TV broadcasting includes the steps of: changing a current channel to a demanded major channel in response to a demand to change a major channel; and displaying, on a TV screen, minor channel numbers of programs received through a currently selected major channel.

In accordance with another aspect of the present invention, a method for displaying channel information on a digital TV for receiving digital multichannel TV broadcasting includes the steps of: selecting a radio frequency (RF) channel corresponding to a major channel number selected from a user; displaying one of programs of minor channels received through a currently selected major channel by the selected RF channel as a viewing program; and displaying minor channel numbers received through the major channel on a television screen.

In accordance with still another aspect of the present invention, a method for displaying channel information on a digital TV for receiving digital multichannel TV broadcasting includes the steps of: displaying a channel select menu on a TV screen in response to a demand from a user, wherein the channel select menu includes a scroll bar window having a scroll bar moving area split into prescribed areas so as to cover all received channels and includes a channel window for displaying channel numbers of partial channels corresponding to a position of a scroll bar; determining if the scroll bar moves; and if the scroll bar moves, changing channel numbers on the channel window to channel numbers of channels corresponding to a position of the scroll bar.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which:

FIGS. 7A and 7B are exemplary diagrams showing channel information displayed on a screen according to the third preferred embodiment of the present invention;

DETAILED DESCRIPTION OF THE PREFERRED EMBODIMENTS

In the following description, numerous specific details are set forth to provide a more thorough understanding of the present invention. It will be apparent, however, to one skilled in the art that the present invention may be practiced without these specific details. In other instances, well-known functions or constructions which may obscure the invention in unnecessary detail are not described in detail.

Figure 1:
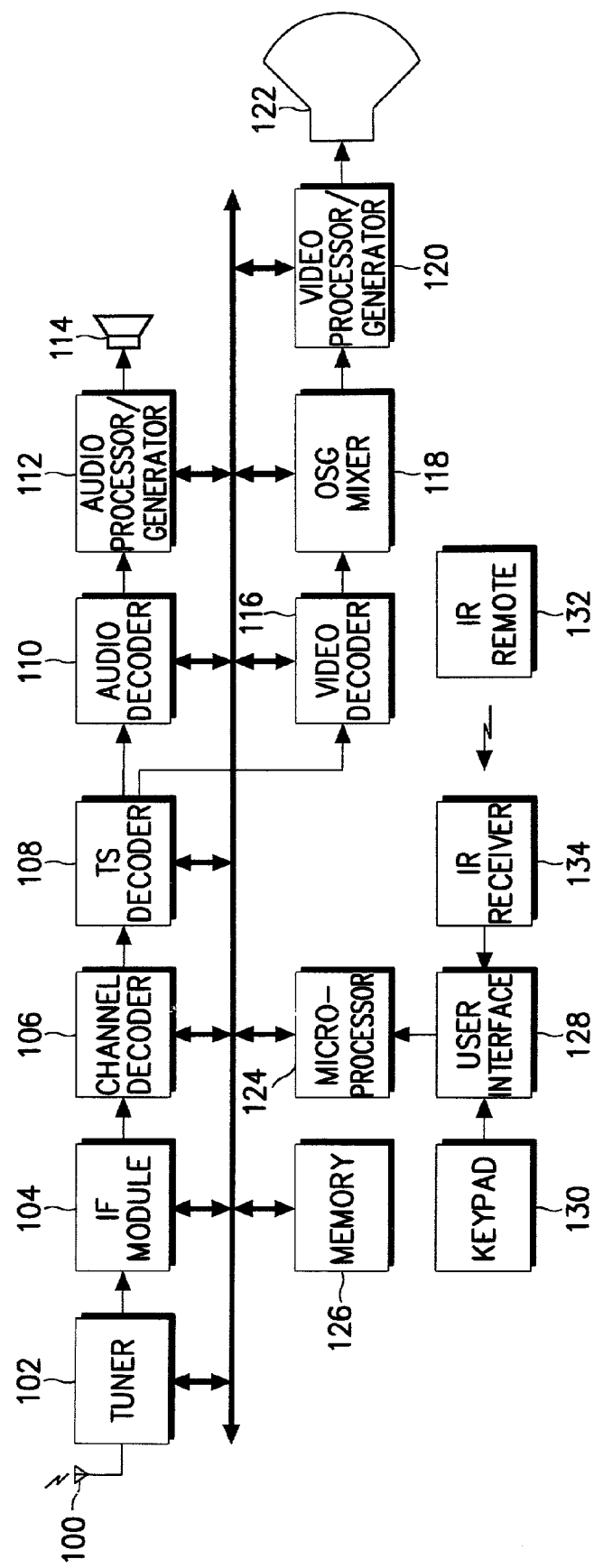
FIG. 1 is a block diagram of an HDTV to which the present invention is applicable.

FIG. 1 is a block diagram of a digital TV, for example, an HDTV adopting the MPEG (Moving Picture Expert Group) standard. A tuner 102 receives a broadcasting signal through an antenna 100 and selects an RF channel under the control of a microprocessor 124. Therefore, an intermediate frequency (IF) signal of the selected RF channel is generated by the tuner 102. An IF module 104 converts the IF signal into a baseband signal. A channel decoder 106 decodes the baseband signal to reproduce a data bit stream. A transport stream (TS) decoder 108 separates the reproduced data bit stream into audio data, video data, and supplementary data.

The audio data is supplied to an audio decoder 110 where it is decoded according to the MPEG or Dolby AC-3 standard, The decoded audio data is processed by an audio processor/generator 112 and then sent as a voice through a speaker 114. Meanwhile, the video data is supplied to a video decoder 116 where it is decoded according to the MPEG standard, The decoded video data is mixed with on-screen graphic (OSG) data by an OSG mixer 118 under the control of the microprocessor 124. The mixed video data is processed by a video processor/generator 120 and then displayed on a TV screen through an image receiving tube 122. The OSG data is for displaying various information on the screen by a graphic or text mode.

A keypad 130 and an infrared (IR) receiver 134 are connected through a user interface 128 to the microprocessor 124 which controls the overall operation of the HDTV. The microprocessor 124 executes a command supplied from the keypad 130 or from an IR remote 132 through the IR receiver 134, according to a program stored in a memory 126. The IR remote 132 may be a remote control or a pointing device such as an air mouse. The command supplied from the IR remote 132 is transmitted to the IR receiver 134 as an IR signal and then transmitted to the microprocessor 124 through the user interface 128. The supplementary data is also supplied to the microprocessor 124 from the TS decoder 108. The supplementary data includes channel related system information which includes the number of major channels, the number of minor channels, and channel numbers of the major and minor channels, such as the above-described EPG information and/or PSI (Program Specific Information). The PSI is a table for program information specified in the MPEG standard.

To store a program of the microprocessor 124, the memory 126 includes a read only memory (ROM), or a nonvolatile memory such as a flash memory. The memory 126 also includes a volatile memory such as a random access memory (RAM) for temporarily storing data generated in the process of executing the program of the microprocessor 124, and includes an electrically erasable and programmable read only memory (EEPROM) for storing various reference data.

The tuner 102, IF module 104, channel decoder 106, TS decoder 108, audio decoder 110, audio processor/generator 112, video decoder 116, OSG mixer 118, video processor/generator 120, and memory 126 are connected to the microprocessor 124 through a bus 136.

Figure 2:
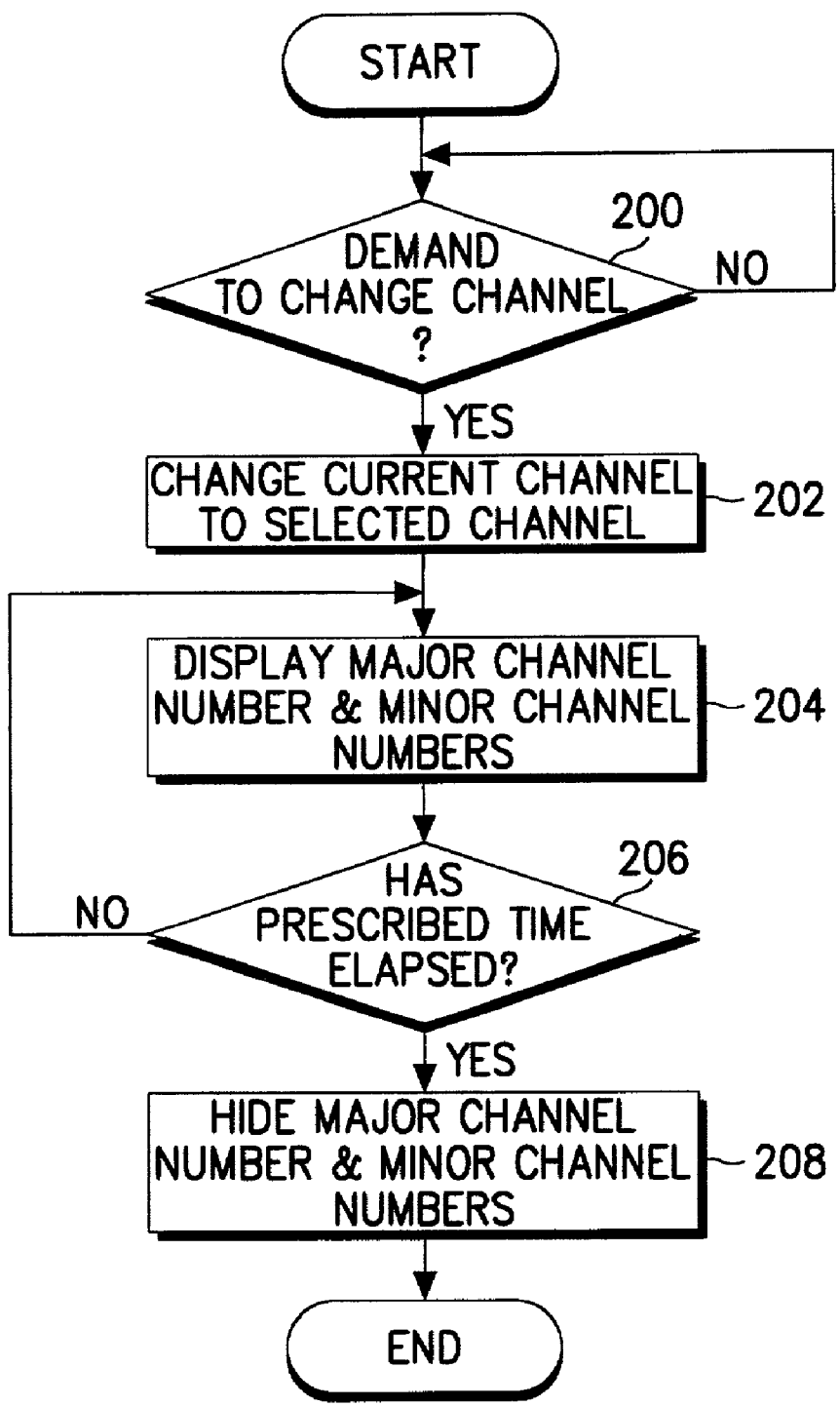
FIG. 2 is a flow chart of a channel information displaying process according to a first preferred embodiment of the present invention.

FIG. 2 shows a processing flow applied to the digital TV such as the HDTV of FIG. 1 and executed by the microprocessor 124, in accordance with a first preferred embodiment of the present invention.

Referring to FIGS. 1 and 2, the microprocessor 124 determines, at step 200, if there is the demand to change a major channel or a minor channel. The demand to change the channel can be done by pressing a channel number, a channel up key or a channel down key using the keypad 130 or the IR remote 132. If there is the demand to change the major or minor channel, the microprocessor 124 changes, at step 202, a current channel to a selected channel, At steps 204 and 206, the microprocessor 124 displays, on the screen for a prescribed time, a major channel number, and minor channel numbers of programs received through a currently selected major channel as channel information by using the OSG mixer 118. The microprocessor 124 obtains information about the major and minor channels from the channel related system information received through a currently selected RF channel.

Figure 3:
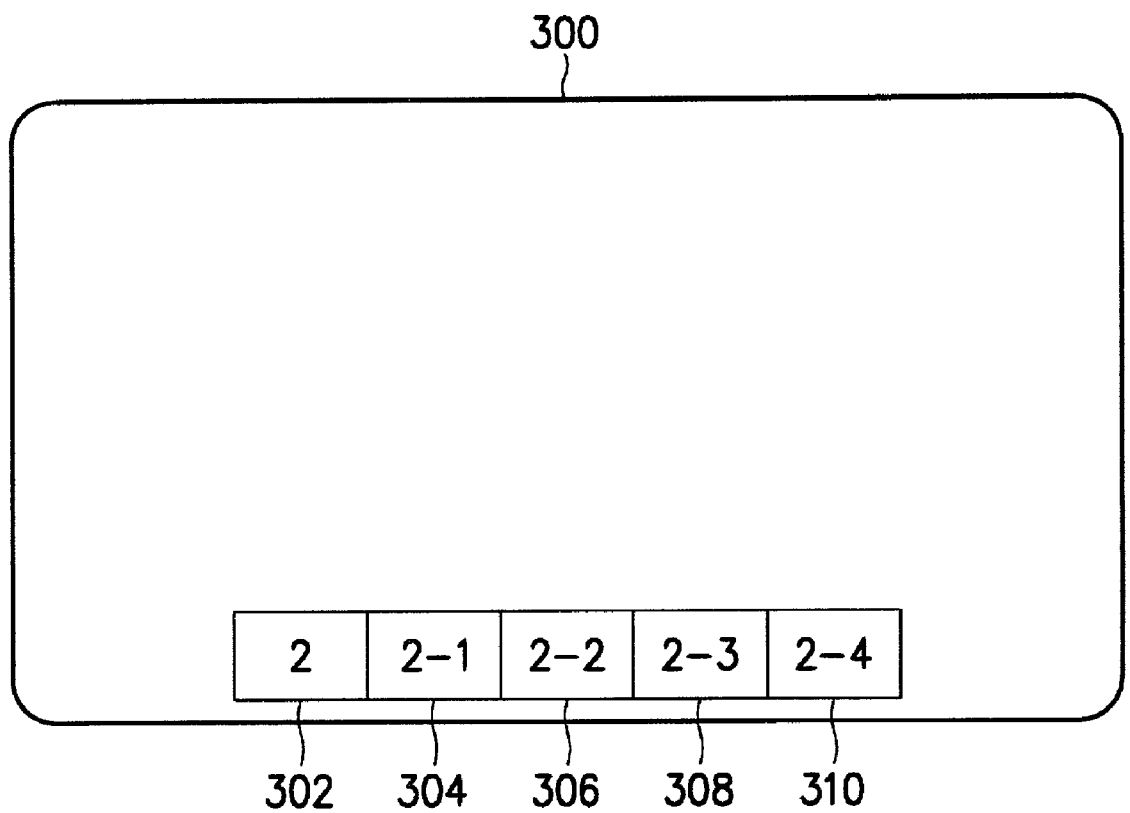
FIG. 3 is an exemplary diagram showing channel information displayed on a screen according to the first preferred embodiment of the present invention.

An example of displaying the major channel number and the minor channel numbers as the channel information is illustrated in FIG. 3. It is assumed that the major channel number is "2", the number of programs received through the major channel number "2" is four, and the minor channel numbers of these programs are "2-1", "2-2", "2-3" and "2-4". A reference numeral "302" denotes the major channel number, and reference numerals "304", "306", "308" and "310" designate the minor channel numbers. As shown, the minor channel numbers "2-1", "2-2", "2-3" and "2-4" are sequentially displayed after the major channel number "2" on a screen 300. Although the minor channel numbers are positioned after the major channel number and horizontally displayed at the bottom of a screen 300 in FIG. 1, their arrangement order or position may vary.

Therefore, if a channel is changed, the user can easily know program information broadcast through the major channel by seeing the minor channel numbers displayed on the screen as the channel information.

Referring back to FIG. 2, if the prescribed time has elapsed after the major channel number and the minor channel numbers are displayed, the microprocessor 124 hides, at step 208, the major channel number and the minor channel numbers displayed on the screen 300.

Figure 4:
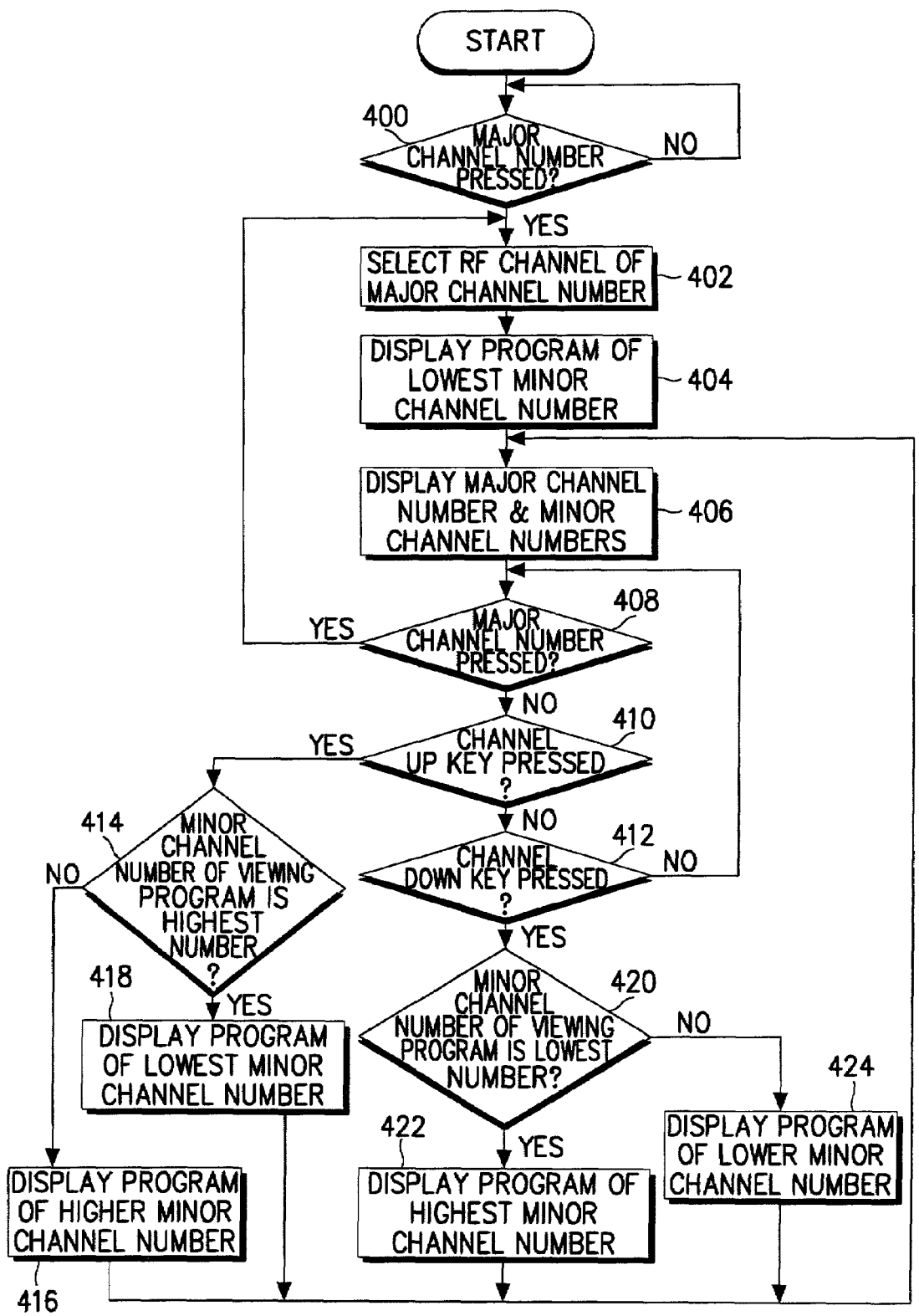
FIG. 4 is a flow chart of a channel information displaying and channel selecting process according to a second preferred embodiment of the present invention.

FIG. 4 shows a processing flow applied to the digital TV such as the HDTV of FIG. 1 and executed by the microprocessor 124, according to a second preferred embodiment of the present invention.

If the user presses a major channel number by using numeral keys on the keypad 130 or the IR remote 132, the microprocessor 124 checks this at step 400 and selects an RF channel of the major channel number by the tuner 102 at step 402. Then, an IF signal of the selected RF channel is generated by the tuner 102 and converted into a baseband signal by the IF module 104. The baseband signal is decoded and reproduced as a data bit stream by the channel decoder 106. The data bit stream is separated into audio data, video data, and supplementary data by the TS decoder 108.

At step 404, the microprocessor 124 obtains information about a major channel received through the selected RF channel and information about minor channels from the channel related system information contained in the supplementary data generated by the RS decoder 108, and displays one of programs received through a currently selected major channel as a viewing program. For example, a program of the lowest minor channel number is selected as the viewing program by controlling the TS decoder 108. Then the audio data and video data of the program selected as the viewing program are generated by the TS decoder 108. Therefore, a voice of the viewing program and an image thereof are sent through the speaker 114 and the image receiving tube 122, respectively. In this case, if only one program is received through the selected major channel, that program is selected as the viewing program.

The microprocessor 124 displays, at step 406, the major channel number and minor channel numbers received through the selected major channel on the screen by using the OSG mixer 118. In such a case, the minor channel numbers are displayed on a viewing program screen in order of number, together with the major channel number.

Figure 5A:
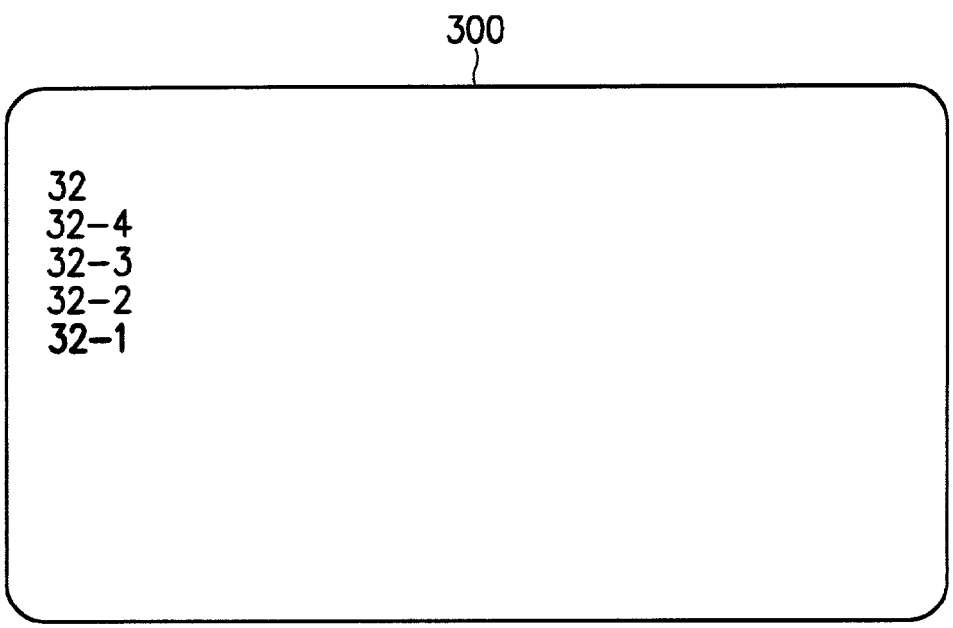
FIGS. 5A, 5B and 5C are exemplary diagrams showing channel information displayed on a screen according to the second preferred embodiment of the present invention.
Figure 5B:
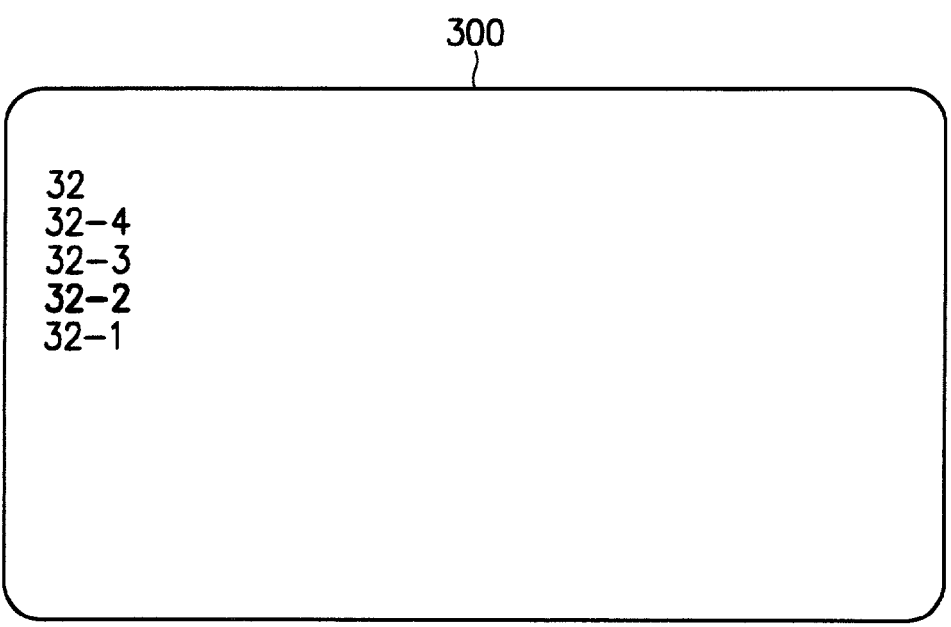
Figure 5C:
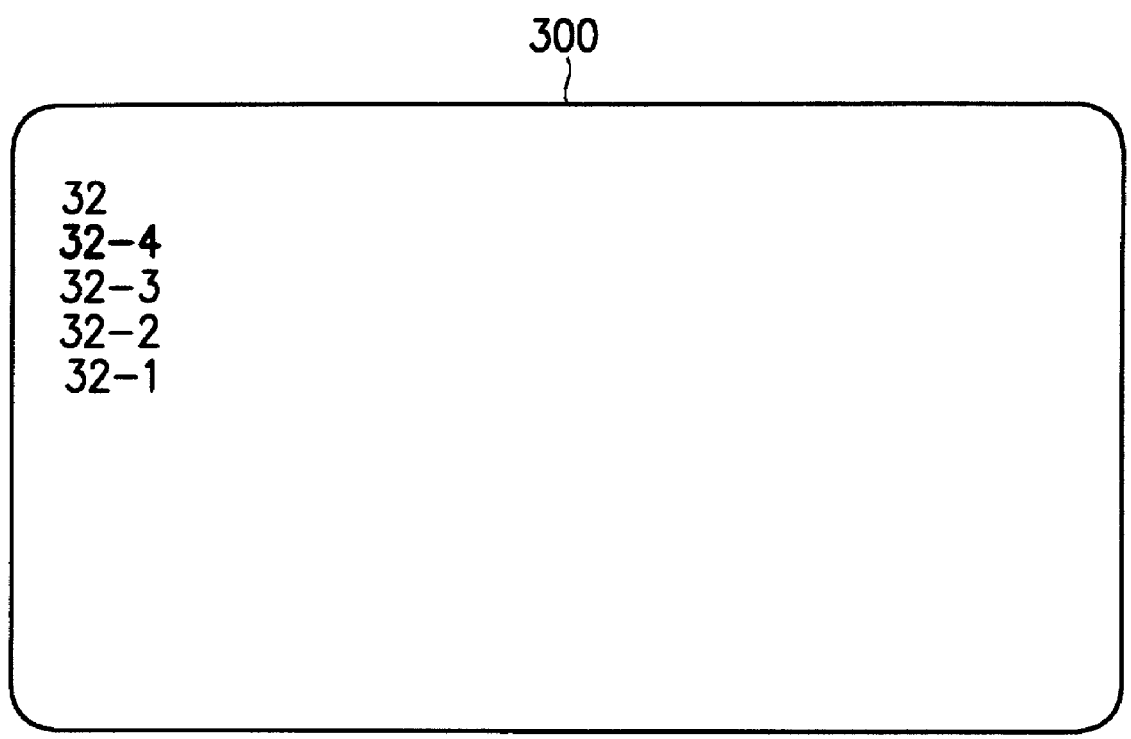

FIGS. 5A, 5B and 5C illustrate examples of displaying the major channel number and the minor channel numbers. It is assumed that the major channel number is "32", there are 4 programs "32-1", "32-2", "32-3" and "32-4" received through the major channel number "32", and the lowest minor channel number among the four programs is "32-1".

In FIG. 5A, assuming that the lowest minor channel number is "32-1" among the four programs received through the major channel number "32", the major channel number "32" and the minor channel numbers "32-4", "32-3", "32-2" and "32-1" are vertically arranged on the top, left side of the screen 300. Namely, the minor channel numbers are arranged from the highest number below the major channel number so as to easily select the minor channel by using the channel up or down key. Further, the minor channel number "32-1" is shown in bold so that the user can be easily aware of the minor channel number selected as the viewing program. Various other methods for displaying the minor channel number of the viewing program may be used. For example, the minor channel number of the viewing program may be distinguished from the other minor channel numbers in color. Moreover, it is possible to modify the arrangement order or position of the channel numbers.

Therefore, if the user selects a major channel by entering a major channel number, he or she can easily know the number of programs or program numbers broadcast through the selected major channel by seeing minor channel numbers displayed on the screen as the channel information.

Referring back to FIG. 4, the microprocessor 124 determines if a major channel number, a channel up key or a channel down key is pressed at steps 408, 410 and 412. If the user presses a major channel number in order to change a current major channel to another one, the microprocessor 124 returns to step 402. The user can select programs of other minor channels by pressing the channel up or down key using the keypad 130 or the IR remote 132. For example, the user can select the 4 programs received through the major channel number "32" by using the channel up or down key as shown in FIGS. 5A, 5B and 5C. If the user presses the channel up key under the screen display state shown in FIG. 5A, the screen display state is changed as illustrated in FIG. 5B. Under such a display state, if the user presses the channel up key twice, the screen display state is changed as shown in FIG. 5C. If the user presses the channel down key under the screen display state shown in FIG. 5B, the screen display state is again changed as illustrated in FIG. 5A. If the channel up key is again pressed under the screen display state shown in FIG. 5C, the screen display state is changed as illustrated in FIG. 5A. Thus the viewing program is changed by selecting a corresponding minor channel whenever the channel up or down key is pressed.

In more detail, if the channel up key is pressed at step 410 indicated in FIG. 4, the microprocessor 124 determines, at step 414, if the minor channel number of the viewing program is the highest number among the programs received through the selected major channel. If it is not, the microprocessor displays, at step 416, a program of a higher minor channel number adjacent to the minor channel number of the viewing program. Thereafter, the microprocessor 124 returns to step 406. For example, if the user presses the channel up key under the screen display state shown in FIG. 5A, the screen display state is changed as illustrated in FIG. 5B. In FIG. 5B, it is assumed that the next higher number of the minor channel number "32-1" of the viewing program is "32-2". Meanwhile, if the minor channel number of the viewing program is the highest number at step 414, the microprocessor 124 displays, at step 418, a program of the lowest minor channel number among the programs. Thereafter, the microprocessor 124 returns to step 406. That is, if the user presses the channel up key under the screen display state shown in FIG. 5C, the screen display state is changed as illustrated in FIG. 5A. In FIG. 5C, it is assumed that minor channel number "32-4" of the viewing program is the highest number.

On the other hand, if the channel down key is pressed at step 412, the microprocessor 124 determines, at step 420, if the minor channel number of the viewing program is the lowest number among the programs received through the selected major channel. If so, the microprocessor 124 displays, at step 422, a program of the highest minor channel number among the programs. Thereafter, the microprocessor 124 returns to step 406. For example, if the user presses the channel down key under the screen display state shown in FIG. 5A, the screen display state is changed as illustrated in FIG. 5C. If the minor channel number of the viewing program is not the lowest number, the microprocessor displays, at step 424, a program of a lower minor channel number adjacent to the minor channel number of the viewing program. Thereafter, the microprocessor 124 returns to step 406. For example, if the user presses the channel down key tinder the screen display state shown in FIG. 5B, the screen display state is changed as illustrated in FIG. 5A.

Therefore, the user checks the number of programs broadcast through a current major channel by the major channel number and the minor channel numbers displayed on the screen as the channel information and can easily select other programs by using the channel up or down key.

Figure 6:
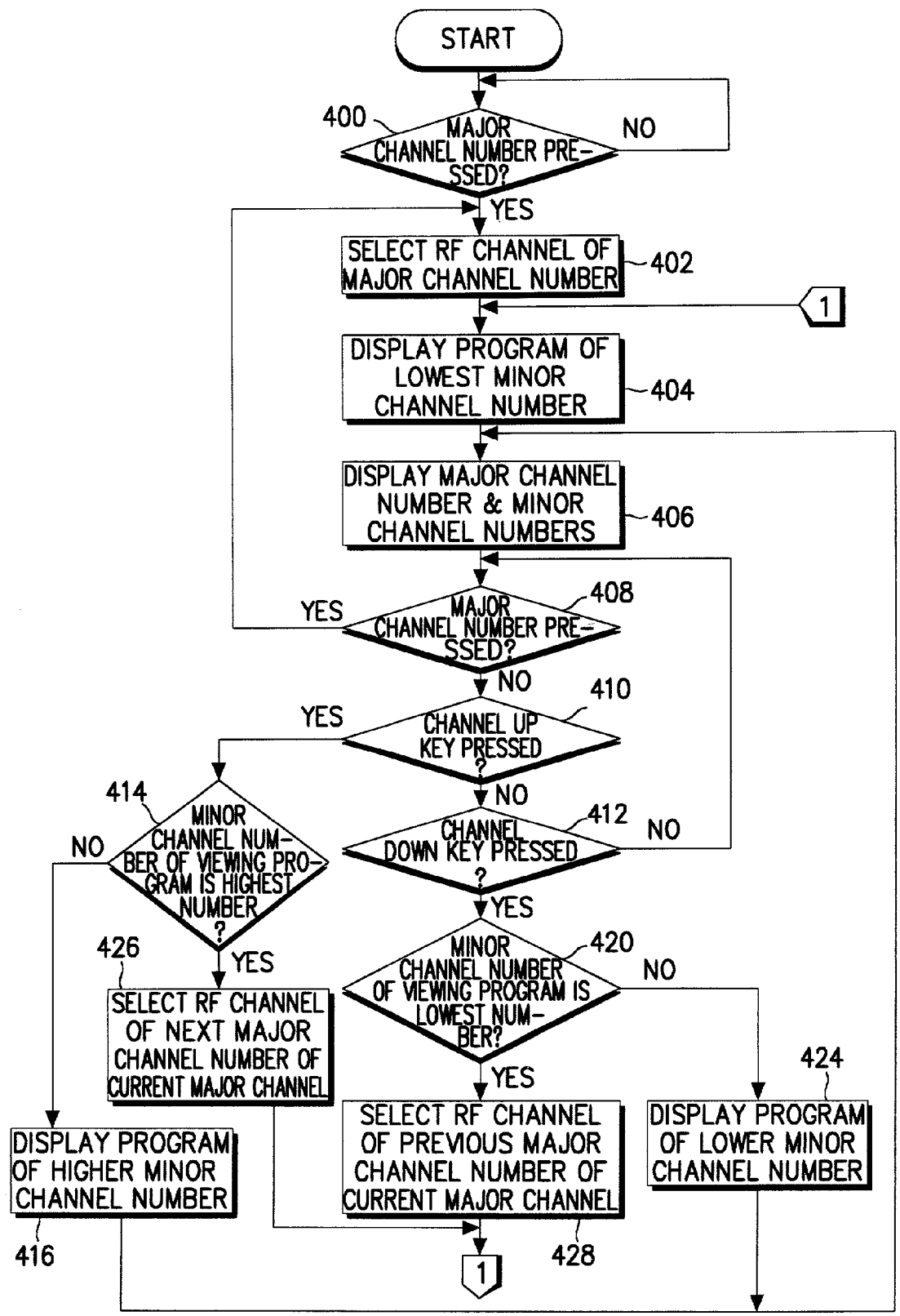
FIG. 6 is a flow chart of a channel information displaying and channel selecting process according to a third preferred embodiment of the present invention.

FIG. 6 is a flow chart showing a channel information displaying process applied to the digital TV' such as the HDTV of FIG. 1, in accordance with a third preferred embodiment of the present invention. The operation of FIG. 6 is executed by the microprocessor 124. Steps 400 to 416, 420 and 424 shown in FIG. 6 are the same as those in FIG. 4. In FIG. 4, the user selects the programs received through the selected major channel by using the channel up or down key. In FIG. 6, however, an adjacent major channel as well as the programs received through the selected major channel can be selected.

If the minor channel number of the viewing program is not the highest number among the programs received through the selected major channel at step 414, the microprocessor displays, at step 416, a program of a higher number adjacent to the minor channel number of the viewing program. If the minor channel number of the viewing program is the highest number, the microprocessor 124 selects, at step 426, the RF channel of the next major channel number of the current major channel by the tuner 102. Thereafter, the microprocessor 124 returns to step 404. For example, if the user presses the channel up key under the screen display state shown in FIG. 5C, the screen display state is changed as illustrated in FIG. 7A. In FIG. 7A, it is assumed that the next major channel number of the major channel number "32" is "40", there are 4 programs received through the major channel number "40", and the lowest minor channel number is "40-1".

Any one of the programs of the next major channel number "40" may be displayed. In this instance, the program of the lowest minor channel number "40-1" is automatically displayed on the TV screen. Also, the next major channel number "40" and the minor channel numbers "40-2," "40-3" and "40-4" along with the lowest minor channel number "40-1" are automattically displayed on the TV screen as illustrated in FIG. 7A.

If the minor channel number of the viewing program is not the lowest number among the programs received through the selected major channel at step 420, the microprocessor displays, at step 424, a program of a lower minor channel number adjacent to the minor channel number of the viewing program. If the minor channel number of the viewing program is the lowest number, the microprocessor 124 selects, at step 428, the RF channel of the previous major channel number of the current major channel by the tuner 102. Thereafter, the microprocessor 124 returns to step 404. For example, if the user presses the channel down key under the screen display state shown in FIG. 5A, the screen display state is changed as illustrated in FIG. 7B. In FIG. 7B, it is assumed that the previous major channel number of the major channel number "32" is "11", there are 4 programs received through the major channel number "11", and the lowest minor channel number is "11-1". Thus the viewing program is changed by selecting a corresponding major channel and a corresponding minor channel whenever the channel up or down key is pressed.

Any one of the programs of the previous major channel "11" may be displayed. In this instance, the program of the highest minor channel number "11-4" is automatically displayed on the TV screen. Also, the previous major channel number "11" and the minor channel numbers "11-1," "11-2" and "11-3" along with the highest minor channel number "11-4" are automatically displayed on the TV screen as illustrated in FIG. 7B.

Therefore, the user checks the number of programs broadcast through a current major channel by the major channel number and the minor channel number and can easily select programs of the currently selected major channel or programs of other major channels by using the channel up or down key.

Figure 8:
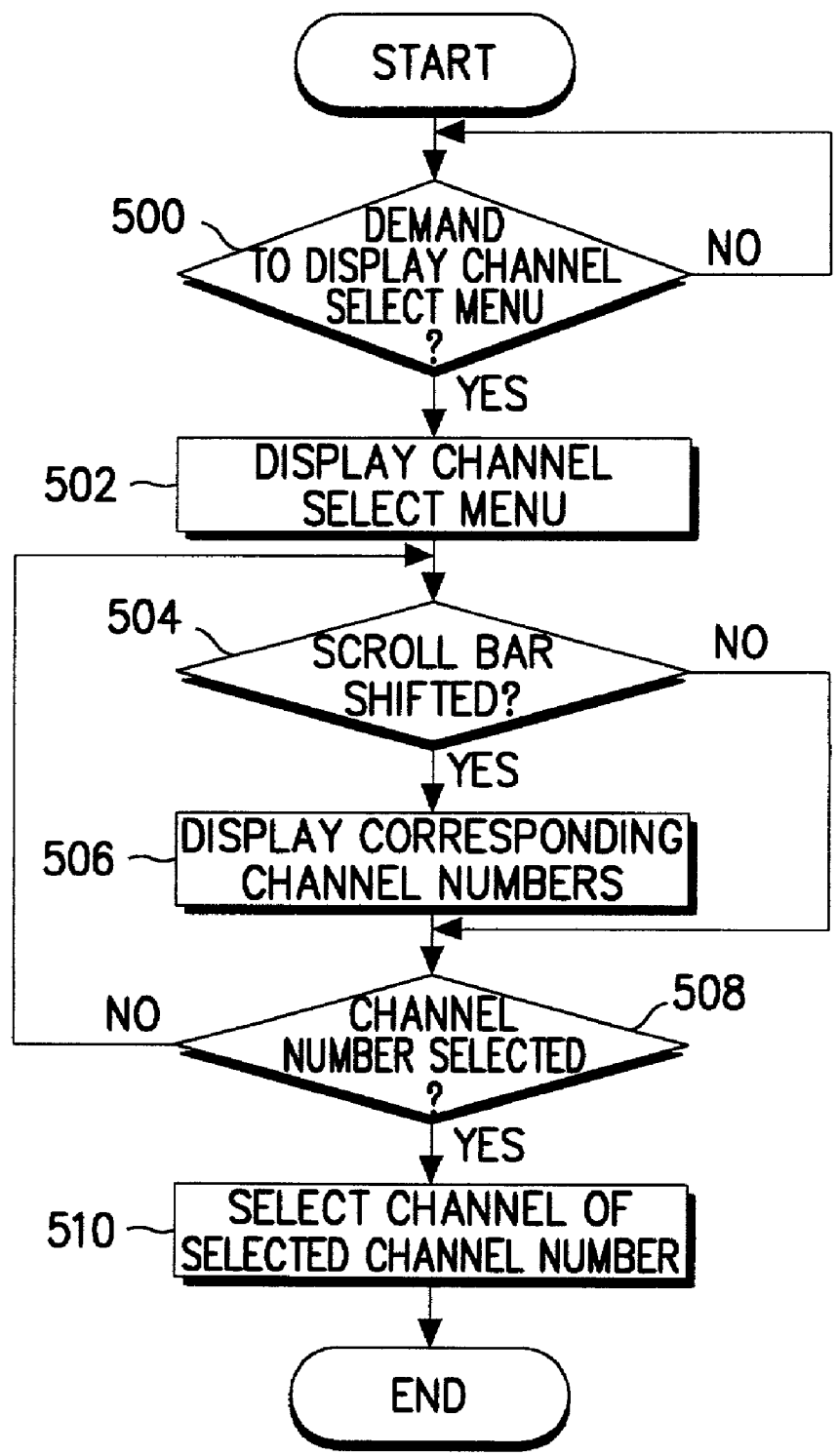
FIG. 8 is a flow chart of a channel information displaying and channel selecting process according to a fourth preferred embodiment of the present invention.

FIG. 8 is a flow chart showing a channel information displaying process applied to the digital TV such as the HDTV of FIG. 1, in accordance with a fourth preferred embodiment of the present invention. The operation of FIG. 8 is executed by the microprocessor 124.

The microprocessor 124 determines, at step 500, if the user demands to display a channel select menu by using the keypad 130 or the IR remote 132. If so, the channel select menu generated through the OSG mixer 118 is displayed at step 502 on the screen 300 as shown in FIG. 9A.

Figure 9A:
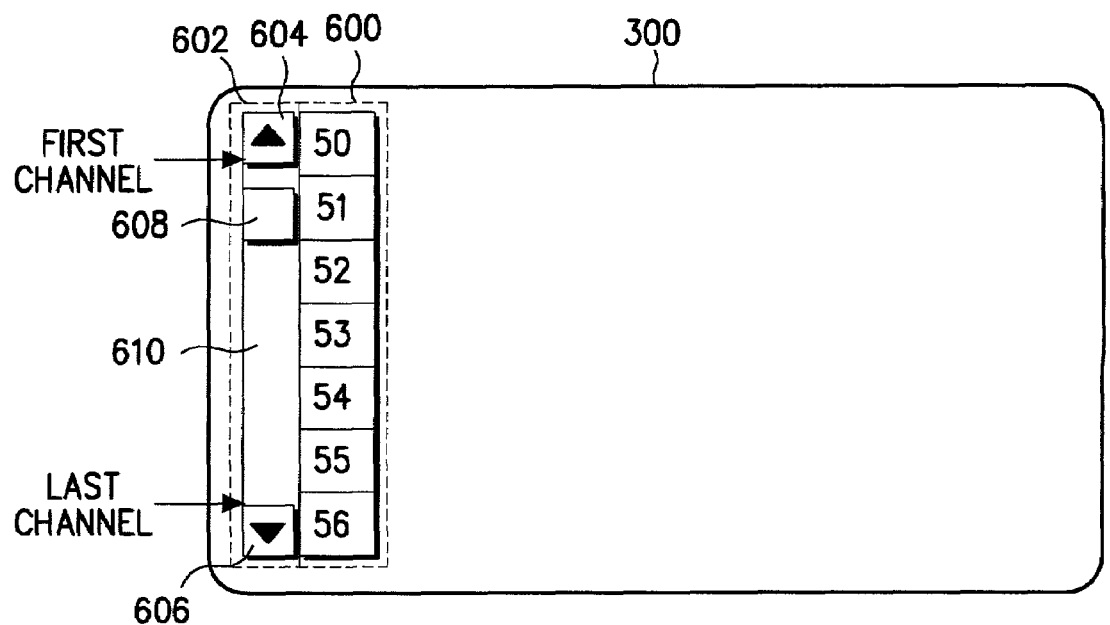
FIGS. 9A and 9B are exemplary diagrams showing channel information displayed on a screen according to the fourth preferred embodiment of the present invention.

The channel select menu indicated in FIG. 9A includes a channel window 600 and a scroll bar window 602 which are vertically extended parallel with each other. The scroll bar window 602 has a scroll bar moving area 610. An up button 604 and a down button 606 are situated at the top and bottom of the scroll bar window 602, respectively, A scroll bar 608 moves up and down along the scroll bar moving area 610. The channel window 600 displays channel numbers of partial channels corresponding to the position of the scroll bar 608. The up and down buttons 604 and 606 shift the scroll bar 608 up and down by one channel unit. The scroll bar moving area 610 between the up and down buttons 604 and 606 is split into prescribed areas so as to cover all the received channels. The whole channels can be retrieved by the microprocessor 124. The scroll bar moving area 610 may be used as only a minor channel area without including an RF channel area or a major channel area, or it may be used as both the minor channel area and the RF or major channel area. Therefore, in accordance with the fourth preferred embodiment of the present invention, the "channel" may denote only the minor channel regardless of the RF or major channel or may include both the minor channel and the RF or major channel and programs. The top of the scroll bar moving area 610 corresponds to the first channel number among all the received channels and the bottom thereof corresponds to the last channel number. For example, if there are 1000 channels from a channel number "0" to "999", the first channel number is "0" and the last channel number is "999". The scroll bar 608 represents partial channels of a prescribed number corresponding to its current position on the scroll bar moving area 610. Channel numbers corresponding to an area indicated by the scroll bar 608 are displayed on the channel window 600. In FIG. 9A, the scroll bar 608 is positioned at a channel range between channel numbers "50" and "56" as displayed on the channel window 600.

The scroll bar 608 moves by dragging the pointing device used as the IR remote 132. If the user clicks, by using the pointing device, a position where the scroll bar 608 is not situated, the scroll bar 608 also moves to the clicked position. If the user clicks the up or down button 604 or 606 by using the pointing device, the scroll bar 608 moves up or down by one channel unit.

Figure 9B:
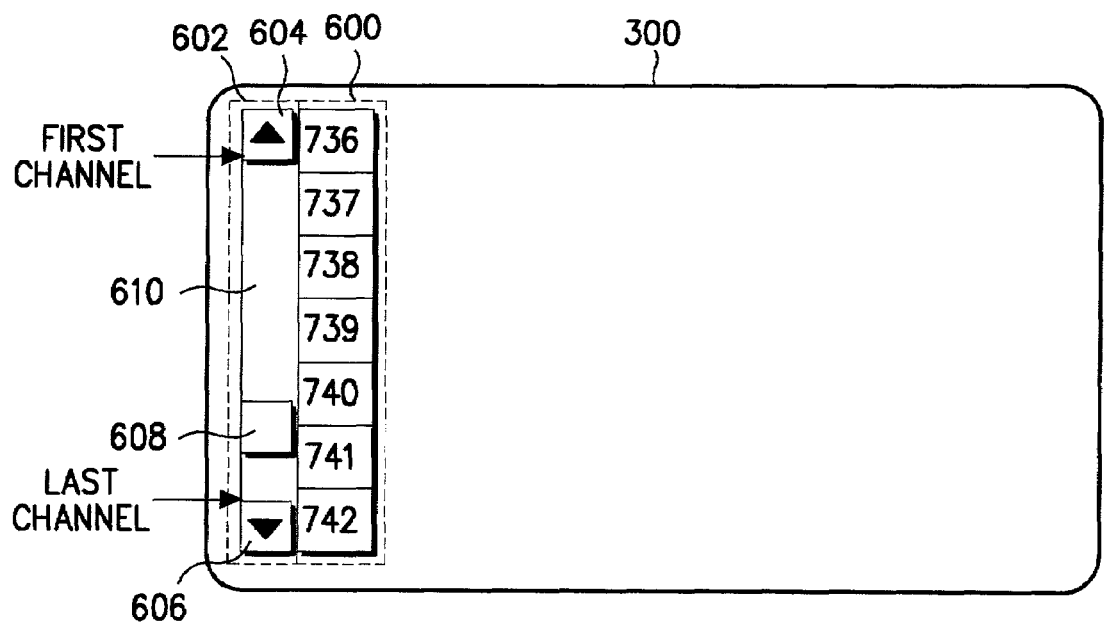

Under the state that the channel select menu is displayed, if the user shifts the scroll bar 608 by using the pointing device, the microprocessor 124 responds to this at step 504 and displays channel numbers corresponding to the position of the shifted scroll bar 608 at step 506. Referring to FIG. 9B, the scroll bar 608 is positioned at a channel range between channel numbers "736" and "742" as displayed on the channel window 600.

If the scroll bar 608 does not move at step 504 or after the corresponding channel numbers are displayed at step 506, the microprocessor 124 determines, at step 508, if any one of the channel numbers displayed on the channel window 600 is clicked by using the pointing device. If it is not clicked, the microprocessor 124 returns to step 504, and if it is clicked, the microprocessor 124 selects a channel of a channel number selected by the user at step 510.

Therefore, the user selects the channel range by shifting the scroll bar 608 and can accurately select any one of channel numbers selected by the scroll bar 608. Such a channel selecting method is more convenient than a method of selecting a channel directly and faster than a method of selecting a channel by using the channel up or down key.

While the invention has been shown and described with reference to certain preferred embodiments thereof, it will be understood by those skilled in the art that the invention should not be limited to the specific embodiments illustrated above.

For example, the present invention may be applicable to all digital TVs in additional to the HDTV. In the second and third embodiments of the present invention, the user changes a major channel or a minor channel by using the channel up or down key However, the present invention may be applied to a method for displaying only the number of programs broadcast through a major channel. Similarly, in the fourth embodiment of the present invention, it is possible to apply the present invention to a method for displaying only channel information. Therefore, the present invention should be understood as including all possible embodiments and modifications which do not depart from the spirit and scope of the invention as defined by the appended claims.

What is claimed is:

1. A method for displaying channel information on a display device for receiving multichannel television broadcasting, comprising:

selecting a major channel number on a channel select menu of said display device; and displaying simultaneously a major channel number and at least one minor channel number of programs received through said major channel;

wherein said channel select menu includes a scroll bar window having a scroll bar to display the channel numbers of partial channels corresponding to a position of a scroll bar.

2. The method as claimed in claim 1, further comprising:

determining if one of the channel numbers displayed on a channel window of the channel select menu is selected; and if one of the channel numbers is selected, selecting a channel of the selected channel number.

3. The method as claimed in claim 1, wherein the displaying further comprises displaying the channel numbers corresponding to the minor channels without displaying the channel number corresponding to the major channel.

4. The method as claimed in claim 1, wherein the displaying further comprises displaying the channel numbers corresponding to the minor channels and displaying the channel number corresponding to the major channel.

5. The method as claimed in claim 1, wherein the displaying comprises displaying the major channel number as "X" and the minor channel number as "X.Y," wherein X and Y represent numerals.

6. The method as claimed in claim 1, wherein the displaying comprises displaying the minor channel numbers and the major channel number simultaneously.

7. The method as claimed in claim 1, wherein the displaying comprises displaying in a format of X, X-1, X-2 ... X-n, wherein X is the major channel number, 1, 2 ... n are minor channel numbers, and n is the highest minor channel number.

* * * * *